(12) United States Patent
Matsumoto et al.

(10) Patent No.: US 10,604,112 B2
(45) Date of Patent: Mar. 31, 2020

(54) CONTROL SYSTEM AND MOBILE DEVICE

(71) Applicants: DENSO CORPORATION, Kariya, Aichi-pref. (JP); NIPPON SOKEN, INC., Nishio, Aichi-pref. (JP)

(72) Inventors: Munenori Matsumoto, Nishio (JP); Yuki Tokunaga, Kariya (JP)

(73) Assignees: DENSO CORPORATION, Kariya, Aichi-pref. (JP); SOKEN, INC., Nishio, Aichi-pref. (JP)

( * ) Notice: Subject to any disclaimer, the term of this patent is extended or adjusted under 35 U.S.C. 154(b) by 0 days.

(21) Appl. No.: 15/115,707

(22) PCT Filed: Jan. 21, 2015

(86) PCT No.: PCT/JP2015/000259
§ 371 (c)(1),
(2) Date: Aug. 1, 2016

(87) PCT Pub. No.: WO2015/118821
PCT Pub. Date: Aug. 13, 2015

(65) Prior Publication Data
US 2017/0008488 A1    Jan. 12, 2017

(30) Foreign Application Priority Data
Feb. 5, 2014 (JP) .................................. 2014-020210

(51) Int. Cl.
*B60R 25/24* (2013.01)
*B60R 25/31* (2013.01)
(Continued)

(52) U.S. Cl.
CPC .............. *B60R 25/24* (2013.01); *B60R 25/31* (2013.01); *G07C 9/00309* (2013.01);
(Continued)

(58) Field of Classification Search
CPC .......... B60R 25/24; B60R 25/31; H04L 67/12
(Continued)

(56) References Cited

U.S. PATENT DOCUMENTS 4,543,577 A * 9/1985 Tachibana ............. G01S 13/536
340/901
6,483,425 B1    11/2002 Avenel
(Continued)

FOREIGN PATENT DOCUMENTS

| JP | 960367 A | 3/1997 |
|---|---|---|
| JP | H10163915 A | 6/1998 |

(Continued)

OTHER PUBLICATIONS

The Illustrated Dictionary of Electronics, 8th Edition, Stan Gibilisco, 2001, p. 337. (Year: 2001).*

*Primary Examiner* — Omer S Khan
(74) *Attorney, Agent, or Firm* — Harness, Dickey & Pierce, P.L.C.

(57) ABSTRACT

A control system includes: a transmission device that transmits a plurality of signals having different frequencies from one of a first communication unit mounted in a vehicle and a second communication unit mounted in a mobile device carried by a user in such a manner that the plurality of signals are combined to generate a predetermined composite signal in an area located at a distance from the first communication unit, the distance being not more than a predetermined distance; and a permission device that permits a predetermined action of the vehicle when the predetermined composite signal generated in the area from the plurality of signals transmitted by the transmission device is detected and an authentication signal transmitted by the second communication unit is authenticated as an authorized authentication signal for the vehicle.

9 Claims, 10 Drawing Sheets

(51) Int. Cl.
*G07C 9/00* (2006.01)
*H04W 12/06* (2009.01)
*H04W 12/12* (2009.01)
*H04W 12/00* (2009.01)
*H04L 29/08* (2006.01)

(52) U.S. Cl.
CPC .. *H04W 12/06* (2013.01); *G07C 2009/00793* (2013.01); *G07C 2209/61* (2013.01); *G07C 2209/63* (2013.01); *H04L 67/12* (2013.01); *H04W 12/00503* (2019.01); *H04W 12/12* (2013.01)

(58) Field of Classification Search
USPC ........................................................ 340/5.61
See application file for complete search history.

(56) References Cited

U.S. PATENT DOCUMENTS

| | | | |
|---|---|---|---|
| 2003/0001723 A1 | 1/2003 | Masudaya | |
| 2004/0000986 A1* | 1/2004 | Ott | G01S 13/84 340/5.2 |
| 2007/0037546 A1* | 2/2007 | Steed, Jr. | H04B 1/28 455/334 |
| 2007/0081694 A1* | 4/2007 | Ryan, Jr. | G07D 7/20 382/100 |
| 2008/0150699 A1* | 6/2008 | Ohara | G01S 13/84 340/10.4 |
| 2009/0323772 A1* | 12/2009 | Sanji | H04B 1/7077 375/141 |
| 2012/0293302 A1* | 11/2012 | Matsumoto | B60R 16/00 340/5.61 |
| 2013/0038484 A1* | 2/2013 | Ohkado | G01S 13/345 342/70 |

FOREIGN PATENT DOCUMENTS

| | | |
|---|---|---|
| JP | 2000185627 A | 7/2000 |
| JP | 2003013644 A | 1/2003 |
| JP | 2003512218 A | 4/2003 |
| JP | 2007153190 A | 6/2007 |
| JP | 2012056343 A | 3/2012 |
| JP | 2012067500 A | 4/2012 |

* cited by examiner

CONTROL SYSTEM AND MOBILE DEVICE

CROSS REFERENCE TO RELATED APPLICATIONS

This application is a U.S. National Phase Application under 35 U.S.C. 371 of International Application No. PCT/JP2015/000259 filed on Jan. 21, 2015 and published in Japanese as WO 2015/118821 A1 on Aug. 13, 2015 . This application is based on and claims the benefit of priority from Japanese Patent Application No. 2014-020210 filed on Feb. 5, 2014. The entire disclosures of all of the above applications are incorporated herein by reference.

TECHNICAL FIELD

The present disclosure relates to a control system and a mobile device.

BACKGROUND ART

There has been a proliferation of smart key systems for vehicles. A vehicle provided with a smart key system transmits a signal requesting a reply including an ID, in response to, for example, a touch of a door handle or operation of an engine start switch by a user. A key transmits its ID in reply to the signal. The system checks the ID returned by the key against the master ID stored in an onboard device, and permits the door to unlock or the engine to start if the ID is validated. Alternatively, an onboard device may transmit polling signals reaching the vicinity of the vehicle periodically without operation by a user.

For example, Patent Literature 1 discloses a smart key system for preventing theft of a vehicle more reliably. The smart key system includes a device to determine whether an occupant intends to continue driving. When a mobile device is away from a vehicle and if it is determined that an occupant having no mobile device intends to continue driving, the system permits the internal combustion engine to restart.

Such smart key systems may be deceived by a method of theft that may be called a relay attack, as exemplified in FIG. 11. In this technique, criminals A and B are located between a vehicle and its owner, who is away from the vehicle. The owner carries a smart key. The criminals A and B carry radio wave relays.

In such a condition, a request signal (a polling signal) transmitted by the vehicle is relayed by the relays carried by the criminals A and B to reach the owner. Although this type of request signal (polling signal) typically has a reach range that is limited to the vicinity of a vehicle, the relays carried by the criminals A and B enable the request signal to reach the owner. In reply to the request signal, the smart key carried by the owner of the vehicle transmits an RF signal including an ID code that is unique to the key and stored therein.

The RF signal transmitted by the key has a relatively long reach range. Upon arrival of the RF signal at the vehicle, the vehicle checks the ID included in the received RF signal against the master ID stored in the vehicle (for authentication). Since the RF signal is transmitted by the smart key carried by the owner, the verification is of course successful. This permits a door of the vehicle to unlock. The criminals can gain entry into the vehicle in this manner.

Then, repeating the similar procedure after the entry of the criminal A into the vehicle produces a successful result of the verification inside the cabin, permitting the engine to start. This allows the criminals to drive away the vehicle. The above brief description pertains to a relay attack.

There is a demand for effective measures against such a relay attack. An effective method to reduce damage caused by a relay attack may include determination whether a mobile device is in the vicinity of a vehicle. With such a measure provided, damage caused by a relay attack can be reduced effectively by permitting a door to unlock or an engine to start if it is determined that a mobile device is in the vicinity of a vehicle, and by prohibiting the door from unlocking or the engine from starting if it is determined that the mobile device is not in the vicinity of the vehicle.

PRIOR ART LITERATURES

Patent Literature

Patent Literature 1: JP-2007-153190-A

SUMMARY OF INVENTION

It is an object of the present disclosure to provide a control system and a mobile device that are capable of reducing damage caused by a relay attack effectively by using a mechanism to determine whether the mobile device is in a vicinity of the vehicle. The control system and the mobile device are for use in a system in which a predetermined action of a vehicle is permitted by wireless communication between the mobile device carried by a user and a vehicle.

According to a first aspect of the present disclosure, a control system includes: a transmission device that transmits a plurality of signals having different frequencies from one of a first communication unit mounted in a vehicle and a second communication unit mounted in a mobile device carried by a user in such a manner that the plurality of signals are combined to generate a predetermined composite signal in an area located at a distance from the first communication unit, the distance being not more than a predetermined distance; and a permission device that permits a predetermined action of the vehicle when the predetermined composite signal generated in the area from the plurality of signals transmitted by the transmission device is detected and an authentication signal transmitted by the second communication unit is authenticated as an authorized authentication signal for the vehicle.

The system described above can reduce damage caused by a relay attack effectively on the basis of whether a composite signal is detected that is generated in a vicinity of the vehicle from a plurality of signals transmitted by the vehicle or the mobile device.

According to a second aspect of the present disclosure, a mobile device includes: a second communication unit having a function to communicate with a first communication unit mounted in a vehicle. The second communication unit includes: a reception device that receives a synchronizing clock signal transmitted by the first communication unit; and a transmission device that transmits a plurality of signals having frequencies different from a signal transmitted by the first communication unit in a period, in which the first communication unit transmits the signal, in synchronization with a clock of the first communication unit based on the clock signal received by the reception device in such a manner that the signals are combined to generate a predetermined composite signal in an area located at a distance from the first communication unit, the distance being not more than a predetermined distance.

The mobile device described above can reduce damage caused by a relay attack effectively on the basis of whether a composite signal is detected that is generated in a vicinity of the vehicle from a plurality of signals transmitted by the vehicle or the mobile device.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
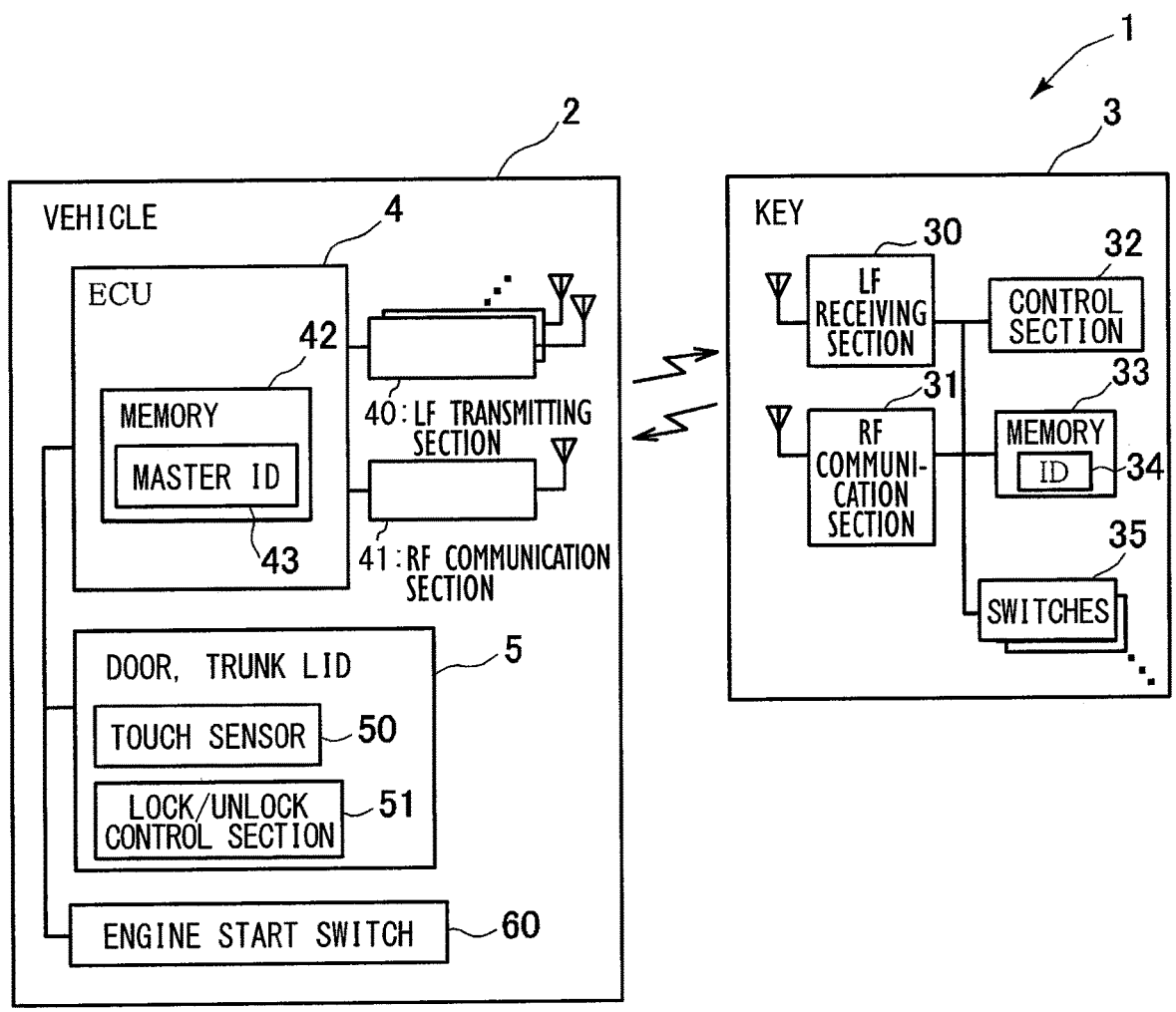
FIG. 1 is a block diagram of a control system according to an embodiment of the present disclosure.

Embodiments of the present disclosure will now be described with reference to the drawings. FIG. 1 is a block diagram of a device configuration of a control system 1 for a vehicle (hereinafter referred to simply as a system 1) according to a first embodiment of the present disclosure. The system 1 illustrated in FIG. 1 includes an ECU (Electronic Control Unit) 4 provided in a vehicle 2 and a key 3 (e.g., a smart key, an electronic key, and a mobile device) that can be carried by a user.

The ECU 4 is provided with an LF transmitting section 40 and an RF communication section 41. The LF transmitting section 40 is disposed at positions such as at each door handle of the vehicle 2 and in a cabin to transmit different signals using electromagnetic waves of an LF (Low Frequency) band to positions inside and outside the cabin of the vehicle 2. The RF communication section 41 is placed, for example, in the cabin to transmit and receive RF signals of, for example, a UHF band for communication with positions in the cabin and outside the vehicle.

The ECU 4 has a configuration of a normal computer and includes a CPU that performs various operations and information processing, a RAM that is a temporary storage serving as a work space for the CPU, and a nonvolatile memory 42 for storing various types of information. The memory 42 stores, for example, a master ID 43.

The vehicle 2 includes a door and a trunk lid 5 each equipped with a touch sensor 50 and a lock/unlock control section 51 (the door and the trunk lid 5 refer to any one of doors and trunk lids that may be included in the vehicle 2). The touch sensors 50 are placed in the vehicle 2 at a door handle and the trunk lid where a user holds to detect a touch of the door handle or the trunk lid by the user. The lock/unlock control sections 51 control the door and the trunk lid so that they are locked or unlocked.

The vehicle 2 also includes an engine start switch 60 near a driver seat in the cabin. The engine start switch 60 is a switch to start an engine in a smart start system. The engine start switch 60 starts the engine when being pushed by a user and if the verification inside the cabin is successful. The engine herein is not limited to internal combustion engines and may refer to a driving unit for a vehicle in general including an electric motor. The components described above are connected to an intra-vehicle communication network (CAN communication) to exchange information with each other.

The key 3 is an electronic key in relation to the smart key system. The key 3 can be carried by a user and includes an LF receiving section 30, an RF communication section 31, a control section 32, a memory 33, and switches 35. The memory 33 stores an identifying signal 34 (e.g., an ID code and an ID) unique to the key 3.

The LF receiving section 30 has a function to receive a wireless signal of an LF band. The RF communication section 31 has a function of transmitting and receiving an RF signal of, for example, a UHF band. The control section 32 has a configuration similar to that of a normal computer and includes a CPU for various types of information processing and a RAM that is a temporary storage serving as a work space for the CPU. The switches 35 are in relation to a wireless keyless system and include lock/unlock switches for the door and the trunk, and a pre-air-conditioning switch. The control section 32 controls the components of the key 3, including the LF transmitting section 30 and the RF communication section 31, so that processing is performed in accordance with the operation of each of the switches 35 by a user.

Figure 2:
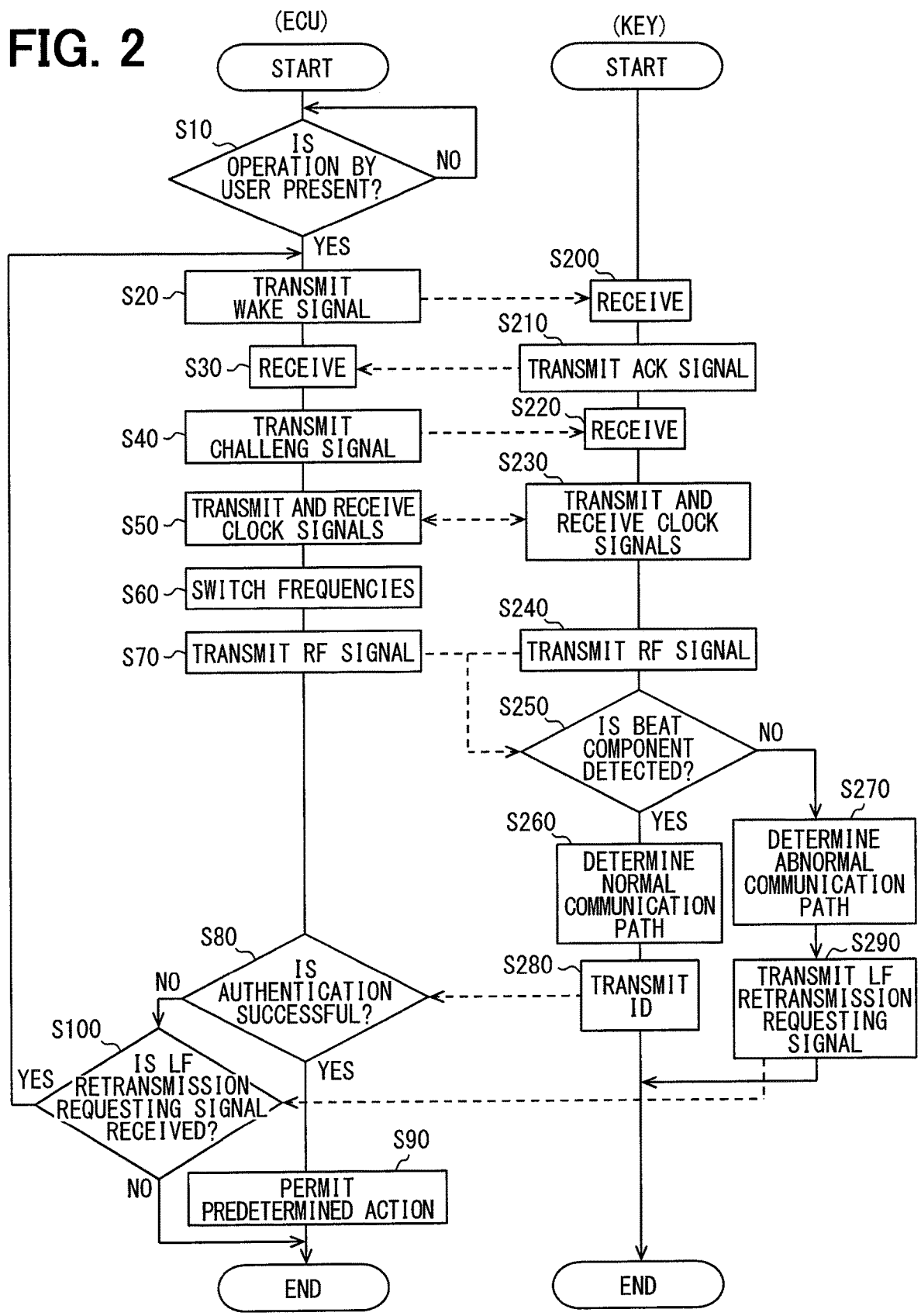
FIG. 2 is a flowchart of an exemplary processing procedure according to a first embodiment.
Figure 7:
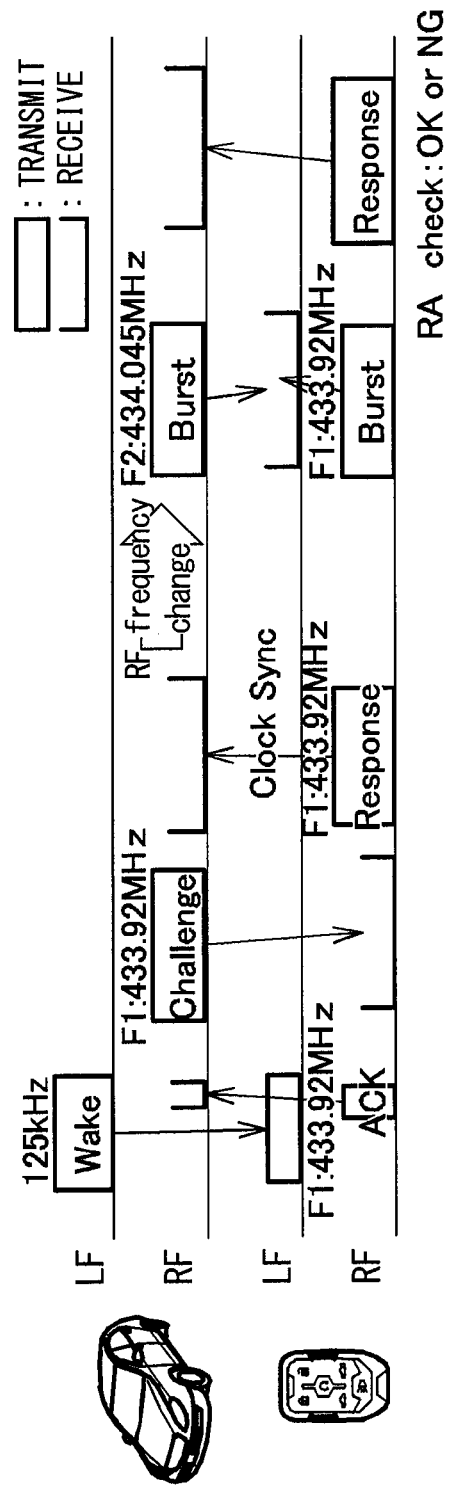
FIG. 7 is a time chart of exemplary transmission and reception of different signals in the first embodiment.

The system 1 having the configuration described above performs a series of operations of a smart entry system and the smart start system that incorporate processing to reduce damage caused by a relay attack. An exemplary procedure of the processing is illustrated in FIG. 2. The processing procedure in FIG. 2 (and those in FIGS. 3 and 4) are programmed in advance and are stored in, for example, the memory 42 and the memory 33, so that the ECU 4 and the control section 32 may call the programs and execute the programs automatically. An exemplary time-dependent transition is illustrated in FIG. 7 in the case of executing the processing in FIG. 2.

With reference to FIG. 2, the ECU 4 determines in step S10 whether any one of the touch sensors 50 disposed at the door handle and the trunk lid is touched or the engine start switch 60 is operated by a user. If a touch of any one of the touch sensors 50 or the operation of the engine start switch 60 is detected (S10: YES), the processing proceeds to step S20. If none of these actions is detected (S10: NO), the processing repeats step S10 until any of the actions is detected.

The ECU 4 causes a corresponding one of the LF transmitting sections 40 to transmit in step S20 a WAKE signal requesting to activate the key 3 (here, if a touch is detected by one of the touch sensors, the corresponding one of the LF transmitting sections 40 is the one that is disposed at the door or the trunk on which the touch is detected, and if the operation of the engine start switch is detected, the corresponding one of the LF transmitting sections 40 is the one that is disposed in the cabin). The frequency of an LF signal is, for example, 125 kHz.

The key 3 receives in step S200 the WAKE signal at the LF receiving section 30; the WAKE signal activates the key 3. Subsequently, the control section 32 causes the RF communication section 31 to transmit in step S210 a signal to acknowledge the reception of the WAKE signal (an ACK signal).

The RF communication section 41 in the vehicle 2 receives in step S30 the ACK signal transmitted by the key 3. The ECU 4 then causes the RF communication section 41 to transmit in step S40 a challenge signal (a signal including a vehicle code and requesting the key to transmit a reply including the ID). The key 3 receives in step S220 the challenge signal at the RF communication section 31. The ECU 4 and the control section 32 transmit and receive in steps S50 and S230 a clock signal to/from each other by bidirectional communication, so that the ECU 4 and the control section 32 have synchronized clocks.

As illustrated in FIG. 7, the RF signals transmitted and received in the processing described above have a frequency of, for example, 433.92 MHz (denoted as a frequency F1). The ECU 4 changes in step S60 the frequency of an RF signal to be transmitted by the RF communication section 41 of the vehicle to 434.045 MHz (denoted as a frequency F2).

The ECU 4 instructs the RF communication section 41 to transmit in step S70 an RF signal of the frequency F2. At the same time, the control section 32 of the key 3 instructs the RF communication section 31 to transmit in step S240 an RF signal of the frequency F1. The synchronization in steps S50 and S230 enables the ECU 4 and the control section 32 to provide the instructions simultaneously. The RF communication section 41 has a transmission output, in step S70, that allows the key 3 to receive the RF signal only if the key 3 is close enough to the vehicle so that it can be determined that no relay attack is conducted.

In the manner described above, the vehicle 2 and the key 3 transmit RF signals simultaneously, with the signal from the vehicle 2 having the frequency F2 and the signal from the key 3 having the frequency F1. As described above, the frequencies F1 and F2 have relatively close values. As is well known, combining signals (electromagnetic waves) having relatively close yet different frequencies produces a beat. Hence, if the key 3 is located in the reach range of the RF signal transmitted by the vehicle 2, a beat is generated in the vicinity of the key 3. In contrast, if the key 3 is located outside the reach range of the RF signal transmitted by the vehicle 2, no beat is produced in the vicinity of the key 3 (and at any other locations).

Presumably, a criminal focuses attention on relaying an LF signal transmitted by a vehicle to a key during a relay attack, but does not consider relaying also an RF signal. Thus, a beat is not likely to be generated in the vicinity of the key 3 during a relay attack. In brief, a beat is produced in the vicinity of the key 3 if the key 3 is located near the vehicle 2; no beat is generated in the vicinity of the key 3 if the key 3 is located far from the vehicle 2, and this holds true also during a relay attack.

Hence, detecting the presence of a beat in the vicinity of the key 3 allows determination whether communication is normal with no relay attack or the communication is accompanied by a relay attack. Furthermore, the frequencies F1 and F2 have a difference value that is in agreement with the value of the frequency of an LF signal (125 kHz). This allows the LF receiving section 30 of the key 3 to detect a beat in the vicinity of the key 3. The processing described above is performed in step S250 and beyond.

The control section 32 determines in step S250 whether the LF receiving section 30 detects a beat component. If a beat component is detected (S250: YES), the processing proceeds to step S260; if no beat component is detected (S250: NO), the processing proceeds to step S270.

A beat is detected in the vicinity of the key 3 in the case of proceeding to step S260; thus, it is assumed that the key 3 is close enough to the vehicle 2 and that no relay attack is conducted, as described above. No beat is detected in the vicinity of the key 3 in the case of proceeding to step S270; hence, it is assumed that the key 3 is far from the vehicle 2 even though the communication up to step S70 is successful, which indicates that a relay attack is conducted.

The control section 32 determines in step S260 that the communication is normal with no intervention by a relay attack, and causes the RF communication section 31 to transmit in step S280 the ID 34 of the key 3. The control section 32 determines in step S270 that the communication is abnormal with intervention by a relay attack, and causes the RF communication section 31 to transmit in step S290 a signal requesting retransmission of an LF WAKE signal (an LF retransmission requesting signal).

The ECU 4 receives the ID 34 and determines in step S80 whether the ID 34 is authenticated successfully. If the ID 34 is received and the authentication is successful (S80: YES), the processing proceeds to step S90. If no ID 34 is received or if it is received but it fails the authentication (S80: NO), the processing proceeds to step S100.

The ECU 4 permits in step S90 a predetermined vehicle action. A predetermined action here refers to an action associated with the operation by the user detected in step S10. Specifically, the predetermined action is an action to unlock the door or the trunk lid if the user operation is a touch of the door or the trunk lid, and an action to start the engine if the user operation is that of the engine start switch.

The ECU 4 determines in step S100 whether an LF retransmission requesting signal is received. If an LF retransmission requesting signal is received (S100: YES), the processing reverts back to step S20 where the procedure described above is repeated. If an LF retransmission requesting signal is not received (S100: NO), the processing in FIG. 2 is finished. The description above pertains to the processing procedure of FIG. 2.

Figure 5:
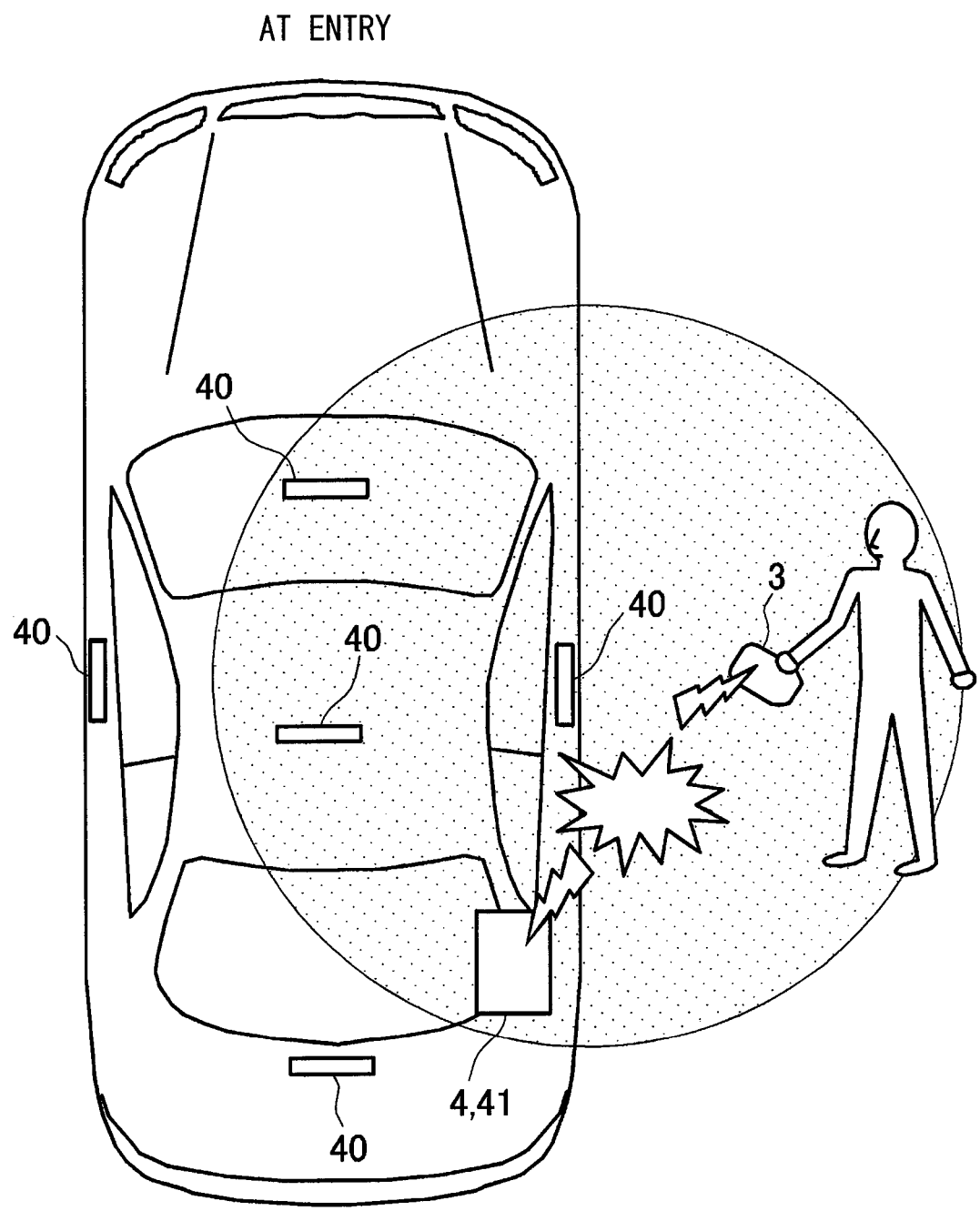
FIG. 5 illustrates an exemplary condition at smart entry.
Figure 6:
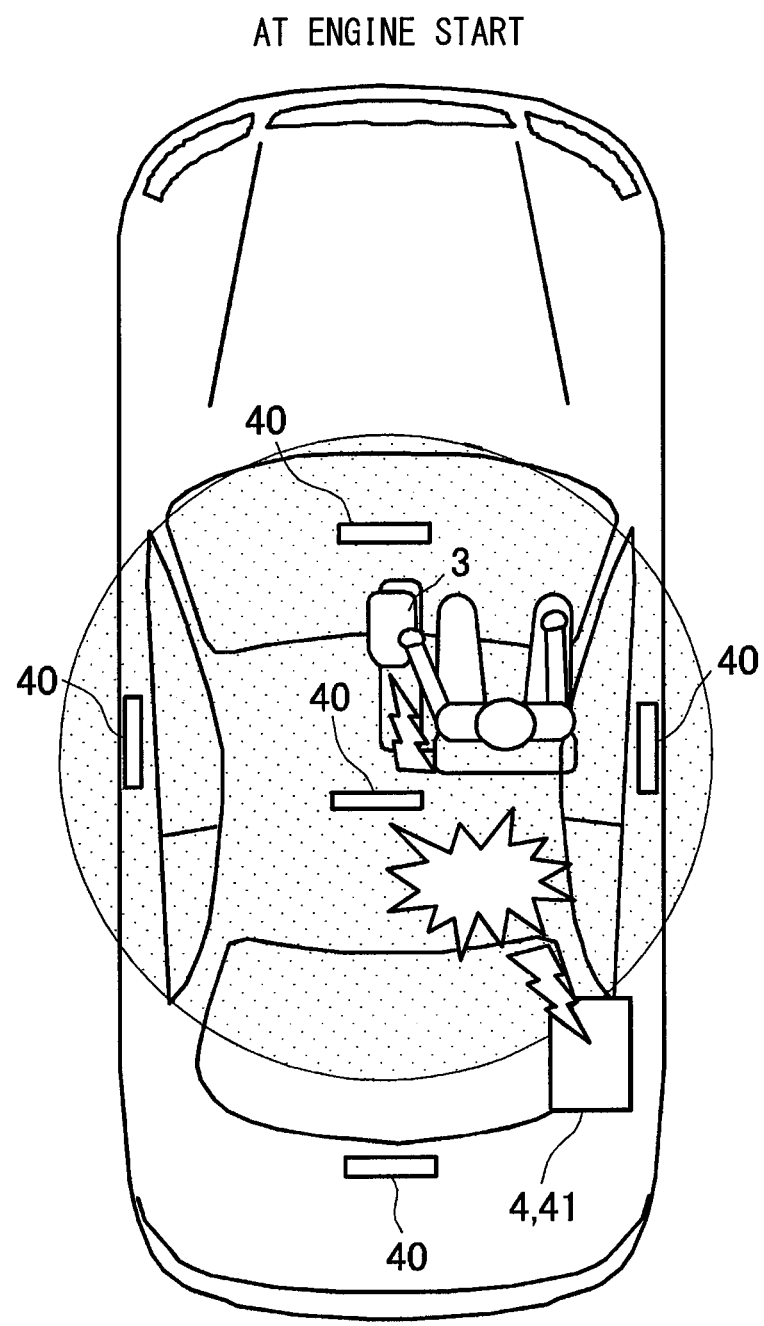
FIG. 6 illustrates an exemplary condition at smart start.

Exemplary conditions at smart entry and smart start are illustrated in FIGS. 5 and 6 in the case of the first embodiment. As illustrated, the key 3 and an occupant of the vehicle are close to the vehicle 2 or inside the cabin with no relay attack conducted; thus, a beat is generated in an area between the RF communication section 41 and the key 3 and the generation of the beat is detected in step S250 described above. This permits a vehicle door or the trunk to unlock or the engine to start.

If the key 3 and a legitimate occupant are located far from the vehicle 2 and a relay attack is conducted, no beat is generated in the area between the RF communication section 41 and the key 3. This prevents the door or the trunk from unlocking and the engine from staring. By performing the processing procedure described above, damage caused by a relay attack can be reduced effectively. Furthermore, a beat to be generated in the example described above has a frequency receivable by the LF receiving section 30. This eliminates the need to change an existing hardware configuration.

Figure 10:
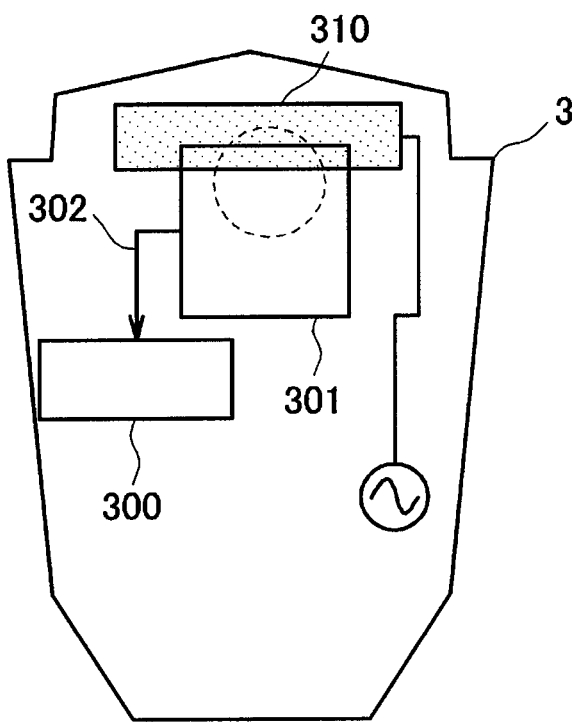
FIG. 10 illustrates an exemplary system configuration of a mobile device.
Figure 11:
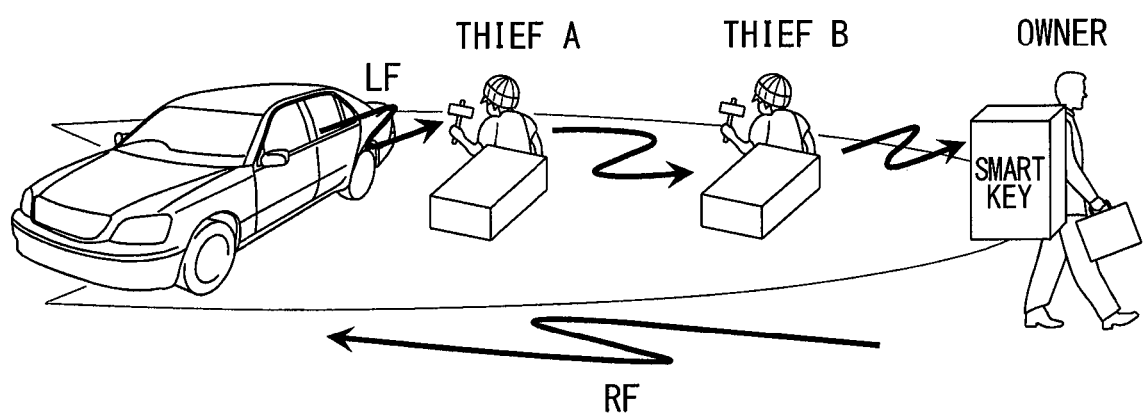
FIG. 11 illustrates an example relay attack.

The detection of a beat in step S250 may be performed as, for example, described below with reference to FIG. 10 in which a configuration of the key 3 is illustrated more specifically. In the configuration illustrated in FIG. 10, the key 3 includes an LF receiving antenna 301, which is included in the LF receiving section 30, and an RF transmitting and receiving antenna 310, which is included in the RF communication section 31. The LF receiving antenna 301 and the RF transmitting and receiving antenna 310 are formed on the front side and the back side of an identical substrate. The LF receiving antenna 301 and the RF transmitting and receiving antenna 310 are placed such that they partially overlap with each other when viewed from the top of the substrate.

A signal line 302 extends from the LF receiving antenna 301 to an LF receiving IC 300. Such a placement, in which the LF receiving antenna 301 and the RF transmitting and receiving antenna 310 are close to each other, ensures that a beat is generated inside the key 3 and that the beat is detected by the LF receiving section 30. With the placement in FIG. 10 in particular, a beat of 125 kHz resulting from combination of RF signals having the two frequencies described above is induced by the signal line 302 and thus can be detected by the LF receiving section 30 reliably.

Figure 3:
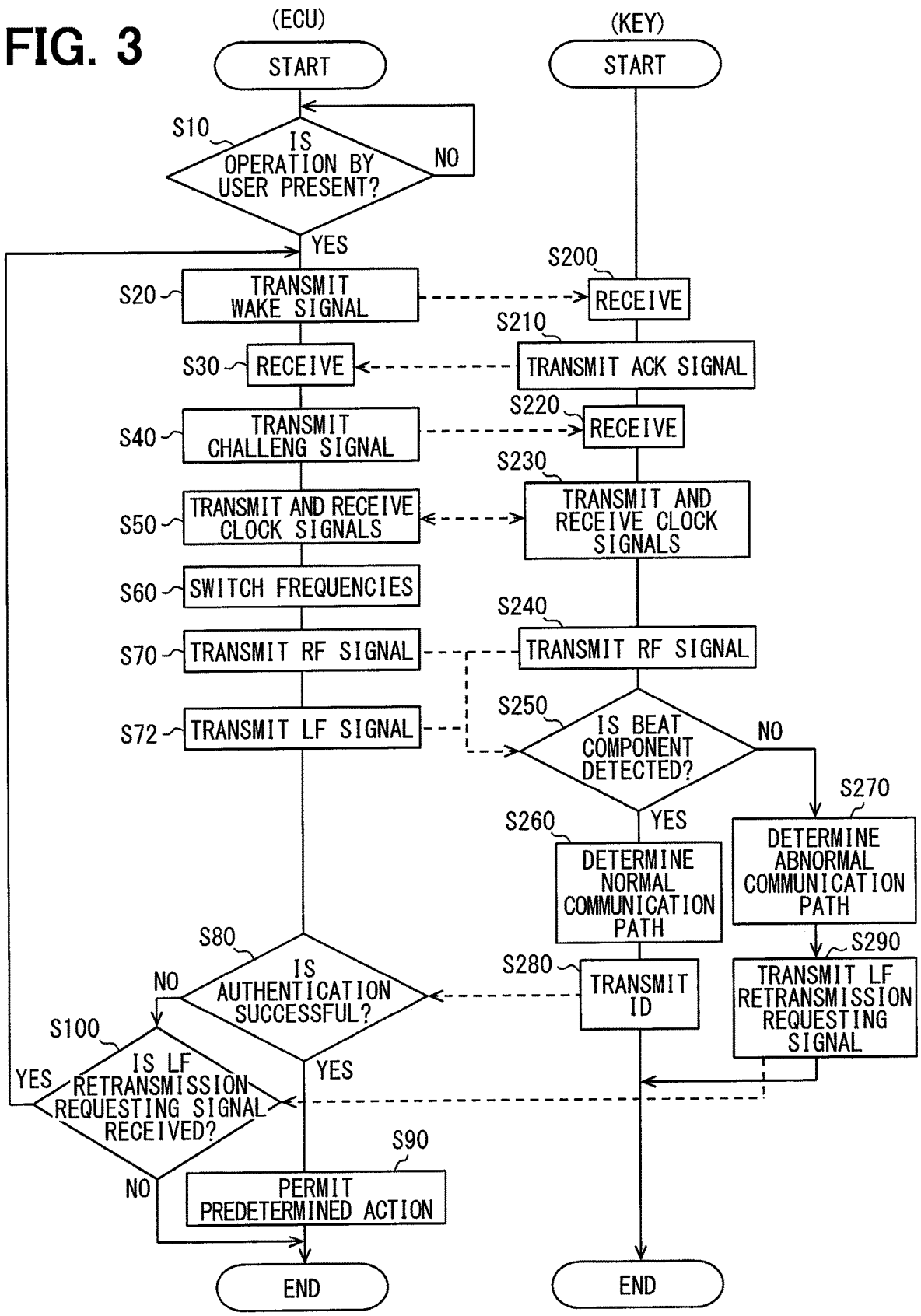
FIG. 3 is a flowchart of an exemplary processing procedure according to a second embodiment.
Figure 8:
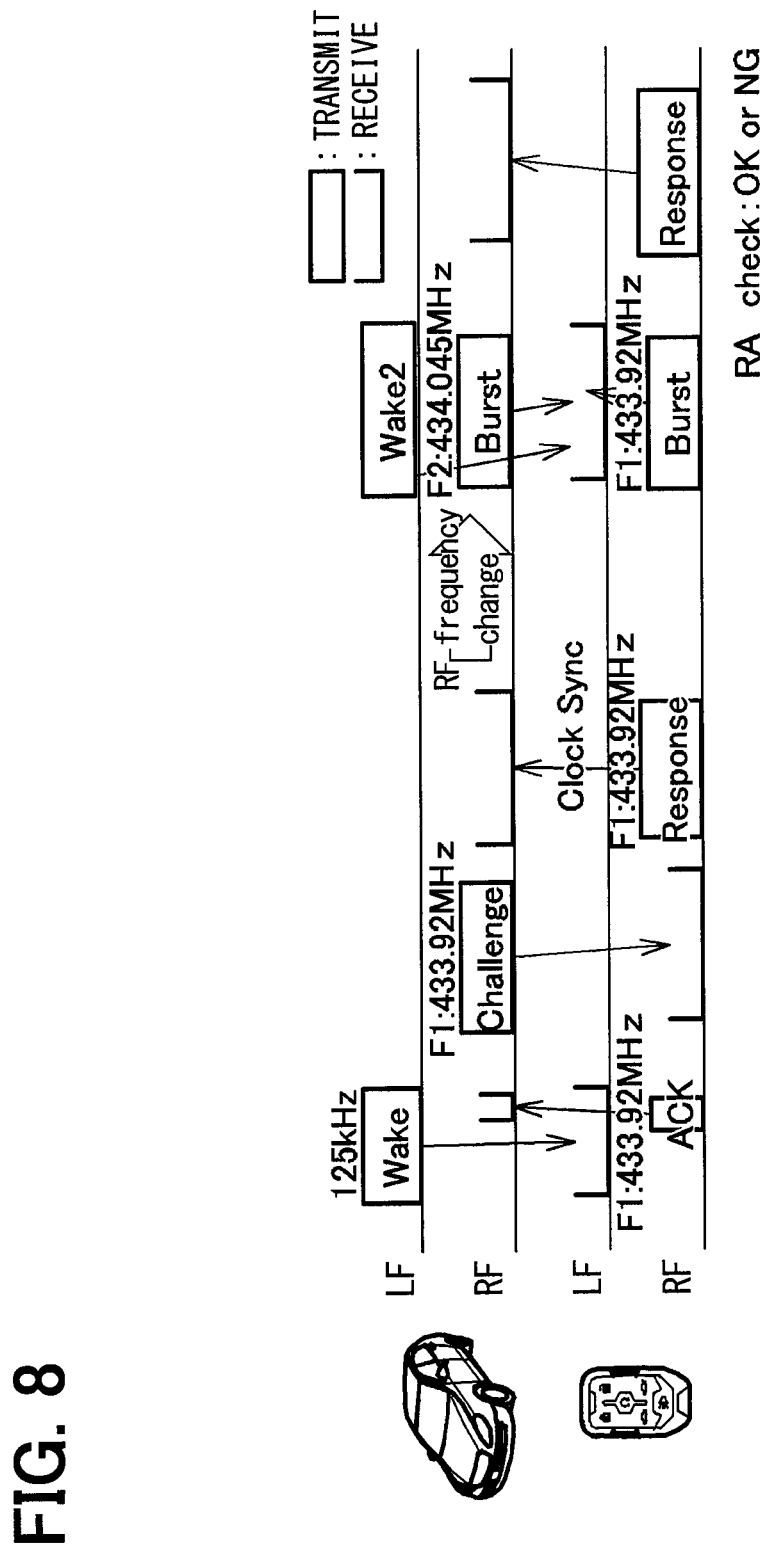
FIG. 8 is a time chart of exemplary transmission and reception of different signals in the second embodiment.

A second embodiment of the present disclosure will now be described. In the first embodiment, two signals are combined; in the second embodiment, three signals are combined. In the second embodiment (and in a third embodiment to be described below), a system configuration identical with that in FIG. 1 may be employed. An exemplary processing procedure according to the second embodiment is described in FIG. 3; an exemplary time-dependent transition in the case of executing this processing procedure is described in FIG. 8. The processing procedure in FIG. 3 is identical with that in FIG. 2, except for the addition of step S72. Components designated with identical symbols with those illustrated in the other figures have similar configurations (unless new description is provided), and duplicate description will be omitted.

In the processing procedure in FIG. 3, RF signals (having frequencies F2 and F1) are transmitted simultaneously in steps S70 and S240. In synchronization with these signals, an LF transmitting section 40 in a vehicle 2 also transmits in step S72 an LF signal (having a frequency of 125 kHz). This further combines the signal of 125 kHz with a beat of 125 kHz resulting from the combination of signals having the frequencies F1 and F2 as in the first embodiment. By defining a pattern of the signal to be transmitted in step S72 appropriately, the three signals described above can be combined to produce an LF signal having a unique pattern. The presence of a relay attack can be determined on the basis of whether the LF signal having the unique pattern is detected in step S250. Hence, damage caused by a relay attack can be reduced by the detection of a composite signal having a unique pattern in the second embodiment.

Figure 4:
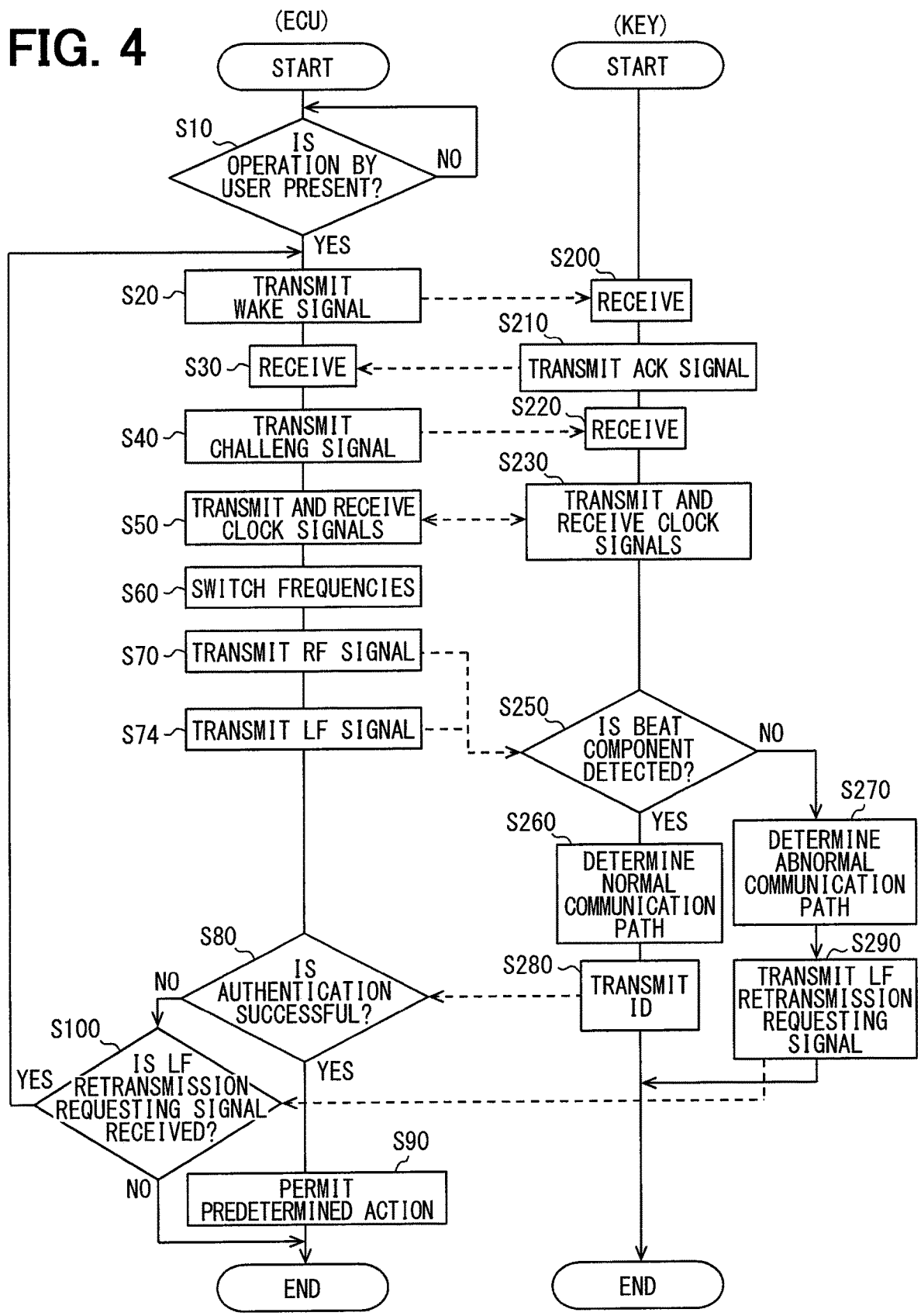
FIG. 4 is a flowchart of an exemplary processing procedure according to a third embodiment.

A third embodiment of the present disclosure will now be described. In the first and second embodiments described above, signals are transmitted by the vehicle 2 and the key 3 to generate a beat; in the third embodiment, a plurality of signals is transmitted by a vehicle 2. An exemplary processing procedure according to the third embodiment is described in FIG. 4; an exemplary time-dependent transition in the case of executing this procedure is described in FIG. 9. The processing procedure in FIG. 4 is identical with that in FIG. 2, except for the addition of step S74 and the elimination of step S240.

Figure 9:
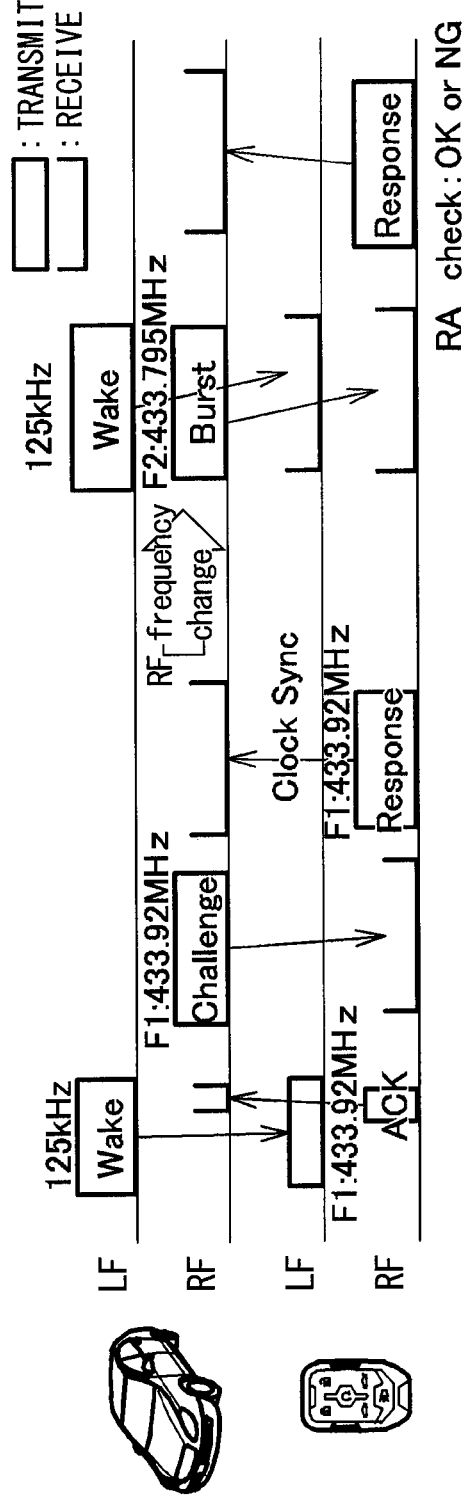
FIG. 9 is a time chart of exemplary transmission and reception of different signals in the third embodiment.

As illustrated in FIG. 9, an RF signal having a frequency of, for example, 433.795 MHz may be transmitted in step S70. In synchronization with this signal, an LF signal of 125 kHz may be transmitted in step S72. The two signals are combined to produce an RF signal of 433.92 MHz. If a key 3 is in the vicinity of the vehicle (in the reach range of the RF signal), an RF communication section 31 can detect this composite signal, which results in an affirmation in the determination in step S250 (YES). Hence, a door or a trunk is permitted to unlock, or an engine is permitted to start in step S90. In the manner described above, the presence of a relay attack can be detected by combining a plurality of signals transmitted only by the vehicle 2 in the third embodiment.

In the examples described above, a challenge signal (a request signal) is transmitted in response to the operation of a user, although polling signals may be transmitted periodically regardless of the operation of a user.

It is noted that a flowchart or the processing of the flowchart in the present application includes sections (also referred to as steps), each of which is represented, for instance, as S10. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A control system comprising: a transmission system that includes a first communication unit mounted in a vehicle, and a second communication unit mounted in a mobile device carried by a user, the second communication unit including an LF receiver, the transmission system causing the first communication unit to transmit a first signal having a first frequency and causing the second communication unit to transmit a second signal having a second frequency different from the first frequency, the first signal and the second signal being combined to generate a beat of a predetermined composite signal in an area located within a predetermined distance from the first communication unit, and the transmission system causing the first communication unit to transmit an LF signal;

wherein, the beat of the predetermined composite signal is combined with the LF signal transmitted by the first communication unit to produce an additional LF signal having a unique pattern; and a permission device that permits a predetermined action of the vehicle when (i) the additional LF signal having the unique pattern is detected by the LF receiver of the second communication unit in the area located within the predetermined distance from the first communication unit and (ii) the second communication unit determines that no intervention by a relay attack and transmits an ID of the second communication unit to the first communication unit as an authorized authentication signal for the vehicle;

wherein:

the first and second signals are electromagnetic waves, and are combined between the vehicle and the mobile device; and the first and second signals are combined in a vicinity of the mobile device and outside of the mobile device between the first communication unit mounted in the vehicle and the mobile device to provide the beat of the predetermined composite signal when the mobile device is located outside of the vehicle.

2. A control system comprising:
a mobile device comprising:
  a second communication unit having a function to communicate with a first communication unit mounted in a vehicle, wherein: the second communication unit includes: an LF receiver:
  a reception device that receives a synchronizing clock signal transmitted by the first communication unit; and
  a transmission device that transmits a second signal having a second frequency different from a first frequency of a first signal transmitted by the first communication unit in a period, in which the first communication unit transmits the first signal, in synchronization with a clock of the first communication unit based on the clock signal received by the reception device the first signal and the second signal being combined to generate a beat of a predetermined composite signal in an area located within a predetermined distance from the first communication unit;
  wherein:
  the beat of the predetermined composite signal is combined with an LF signal transmitted by the first communication unit to produce an additional LF signal having a unique pattern;
  the first and second signals are electromagnetic waves which are combined outside of the mobile device between the mobile device and the first communication unit mounted in the vehicle; and
  the LF receiver detects the additional LF signal having the unique pattern;
the vehicle comprises:
  the first communication unit; and
  a permission device that permits a predetermined action of the vehicle when (i) the additional LF signal having the unique pattern is detected by the LF receiver of the second communication unit in the area located within the predetermined distance from the first communication unit and (ii) the second communication unit determines that no intervention by a relay attack and transmits an ID of the second communication unit to the first communication unit as an authorized authentication signal for the vehicle.

3. A control system comprising: a first transmission device including a first communication unit mounted in a vehicle, the first communication unit transmitting an LF signal;
a second transmission device including a second communication unit mounted in a mobile device carried by a user, the second communication unit including an LF receiver, the first transmission device and the second transmission device simultaneously transmitting a first signal and a second signal, respectively, the first signal transmitted by the first transmission device having a first frequency different from a second frequency of the second signal transmitted by the second transmission device, the first and second signals being combined to generate a beat of a predetermined composite signal in an area located within a predetermined distance from the first communication unit;
wherein, the beat of the predetermined composite signal is combined with the LF signal transmitted by the first communication unit to produce an additional LF signal having a unique pattern; and
a permission device that permits a predetermined action of the vehicle when (i) the additional LF signal having the unique pattern is detected by the LF receiver of the second communication unit in the area located within the predetermined distance from the first communication unit and (ii) the second communication unit determines that no intervention by a relay attack and transmits an ID of the second communication unit to the first communication unit as an authorized authentication signal for the vehicle;
wherein:
the first and second signals are electromagnetic waves, and are combined between the vehicle and the mobile device.

4. The control system according to claim 1, wherein the first signal and the second signal are RF signals.

5. The control system according to claim 4, wherein:
the first signal and the second signal each have a UHF band; and
the LF signal has an LF band that is lower than the UHF band.

6. The mobile device according to claim 2, wherein the first signal and the second signal are RF signals.

7. The mobile device according to claim 6, wherein:
the first signal and the second signal each have a UHF band; and
the LF signal has an LF band that is lower than the UHF band.

8. The control system according to claim 3, wherein the first signal and the second signal are RF signals.

9. The control system according to claim 8, wherein:
the first signal and the second signal each have a UHF band; and
the LF signal has an LF band that is lower than the UHF band.

* * * * *

UNITED STATES PATENT AND TRADEMARK OFFICE
CERTIFICATE OF CORRECTION

PATENT NO. : 10,604,112 B2
APPLICATION NO. : 15/115707
DATED : March 31, 2020
INVENTOR(S) : Munenori Matsumoto et al.

It is certified that error appears in the above-identified patent and that said Letters Patent is hereby corrected as shown below:

On the Title Page

Item (71) Applicants, "DENSO CORPORATION, Kariya, Aichi-pref. (JP); NIPPON SOKEN, INC., Nishio, Aichi-pref. (JP)" should be -- DENSO CORPORATION, Kariya, Aichi-pref. (JP); NIPPON SOKEN, INC., Nisshin-city, Aichi-pref. (JP) --

Item (73) Assignee, "DENSO CORPORATION, Kariya, Aichi-pref. (JP); SOKEN, INC., Nishio, Aichi-pref. (JP)" should be -- DENSO CORPORATION, Kariya, Aichi-pref. (JP); SOKEN, INC., Nisshin-city, Aichi-pref. (JP) --

Signed and Sealed this
Nineteenth Day of May, 2020

Andrei Iancu
*Director of the United States Patent and Trademark Office*